(12) United States Patent
Nayyar

(10) Patent No.: US 12,316,531 B1
(45) Date of Patent: May 27, 2025

(54) APPARATUS, SYSTEM, AND METHOD FOR OPTIMIZING STORAGE USAGE IN CONNECTION WITH SEGMENT IDENTIFIERS

(71) Applicant: Juniper Networks, Inc., Sunnyvale, CA (US)

(72) Inventor: Anish Nayyar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 21 days.

(21) Appl. No.: 18/157,442

(22) Filed: Jan. 20, 2023

(51) Int. Cl.
*H04L 45/24* (2022.01)
*H04L 45/00* (2022.01)
*H04L 47/125* (2022.01)

(52) U.S. Cl.
CPC .............. *H04L 45/24* (2013.01); *H04L 45/38* (2013.01); *H04L 47/125* (2013.01)

(58) Field of Classification Search
CPC ........ H04L 45/24; H04L 45/38; H04L 47/125
See application file for complete search history.

(56) References Cited

U.S. PATENT DOCUMENTS

| 9,900,250 | B2* | 2/2018 | Dong | H04L 45/745 |
|---|---|---|---|---|
| 10,476,786 | B2* | 11/2019 | Semwal | H04L 12/4641 |
| 10,637,687 | B2* | 4/2020 | Brissette | H04L 12/4679 |
| 10,826,816 | B2* | 11/2020 | Brissette | H04L 45/26 |
| 11,502,874 | B2* | 11/2022 | Ranpise | H04L 45/745 |
| 11,716,277 | B2* | 8/2023 | Mohanty | H04L 45/02 370/254 |
| 11,909,637 | B2* | 2/2024 | Kale | H04L 12/66 |
| 2015/0257081 | A1* | 9/2015 | Ramanujan | H04L 45/56 370/329 |
| 2016/0134528 | A1* | 5/2016 | Lin | H04L 12/4641 709/238 |
| 2017/0099180 | A1* | 4/2017 | Singh | H04L 12/4641 |
| 2018/0375763 | A1* | 12/2018 | Brissette | H04L 67/63 |
| 2019/0238449 | A1* | 8/2019 | Michael | H04L 45/123 |
| 2019/0305988 | A1* | 10/2019 | Bickhart | H04L 12/4633 |

FOREIGN PATENT DOCUMENTS

WO WO-2018109536 A1 * 6/2018

OTHER PUBLICATIONS

Toni Pasanen. "EVPN ESI Multihoming—Part II: Fast Convergence and Load Balancing", The Network Times, Jun. 8, 2019, 8 pages. (Year: 2019).*
Sharma et al. "Multi-Site Solution for Ethernet VPN (EvPN) Overlay", IETF Trust, draft-sharma-bess-multi-site-evpn-02, May 12, 2022, 41 pages. (Year: 2022).*

(Continued)

*Primary Examiner* — G. C. Neurauter, Jr.
(74) *Attorney, Agent, or Firm* — Greenberg Traurig, LLP

(57) ABSTRACT

A network device may include (1) at least one storage device configured to store a plurality of SIDs and (2) at least one processing device configured to (A) insert, into the storage device, a single instance of a SID corresponding to a multihomed network segment and/or (B) advertise the SID to a remote network device for aliasing to enable the remote network device to load-balance traffic across the multihomed network segment. Various other apparatuses, systems, and methods are also disclosed.

20 Claims, 5 Drawing Sheets

Table 300

| DT2U SID | uDT2U SID | ESI | EVI | Behavior |
|---|---|---|---|---|
| 4B:69:A5:BE:5E:21:2D:05:D9:5D:09:E0:D3:C2:6D:5E | C:0:3:8:: | 00:41:26:73:43:59:26:57:80:09 | 1F:4D:F0:6A | uDT4 |
| CA:56:69:8E:67:62:6E:CC:14:AA:2B:92:A6:D9:CA:A4 | B:1:4:A:: | 08:12:92:13:64:35:76:97:08:96 | 21:34:F0:7C | uDT6 |
| 42:3F:AD:CA:4F:20:05:DB:6C:9F:EF:FA:E5:10:41:1E | 2:4:8:3:: | 15:31:32:43:47:59:62:72:82:16 | 4A:01:FD:CC | uDX2 |
| ⋮ | ⋮ | ⋮ | ⋮ | ⋮ |
| 0A:F0:04:F8:95:85:C3:A3:83:EE:6E:30:7D:84:34:CC | 4:1:0:A:: | 23:21:40:13:38:95:76:17:84:44 | 14:00:B1:62 | uA (PSP/USD) |

(56) References Cited

OTHER PUBLICATIONS

Rekhter, et al. "Request for Comments (RFC) 4271: A Border Gateway Protocol 4 (BGP-4)", The Internet Society, Jan. 2006, 104 pages. (Year: 2006).*

Bates, et al. "Request for Comments (RFC) 4760: Multiprotocol Extensions for BGP-4", The Internet Society, Jan. 2007, 12 pages. (Year: 2007).*

Filsfils, et al. "Request for Comments (RFC) 8986: Segment Routing over IPv6 (SRv6) Network Programming", IETF Trust, Feb. 2021, 40 pages. (Year: 2021).*

L. Andersson and E. Rosen. "Request for Comments (RFC) 4664: Framework for Layer 2 Virtual Private Networks (L2VPNs)", The Internet Society, Sep. 2006, 44 pages. (Year: 2006).*

Krishnan, et al. "Request for Comments (RFC) 7424: Mechanisms for Optimizing Link Aggregation Group (LAG) and Equal-Cost Multipath (ECMP) Component Link Utilization in Networks", The Internet Society, Jan. 2015, 29 pages. (Year: 2015).*

Sajassi, et al. "Request for Comments (RFC) 7432: BGP MPLS-Based Ethernet VPN", The Internet Society, Feb. 2015, 56 pages. (Year: 2015).*

Sajassi, et al. "Request for Comments (RFC) 7209: Requirements for Ethernet VPN (EVPN)", The Internet Society, May 2014, 15 pages. (Year: 2014).*

K. Kompella and Y. Rekhter. "Request for Comments (RFC) 4761: Virtual Private LAN Service (VPLS) Using BGP for Auto-Discovery and Signaling", The IETF Trust, Jan. 2007, 28 pages. (Year: 2007).*

M. Lasserre and V. Kompella. "Request for Comments (RFC) 4762: Virtual Private LAN Service (VPLS) Using Label Distribution Protocol (LDP) Signaling", The IETF Trust, Jan. 2007, 31 pages. (Year: 2007).*

Mahalingam, et al. "Request for Comments (RFC) 7348: Virtual extensible Local Area Network (VXLAN): A Framework for Overlaying Virtualized Layer 2 Networks over Layer 3 Networks", The IETF Trust, Aug. 2014, 22 pages. (Year: 2014).*

Filsfils, et al. "Request for Comments (RFC) 8402: Segment Routing Architecture", The IETF Trust, Jul. 2018, 32 pages. (Year: 2018).*

* cited by examiner

| DT2U SID | uDT2U SID | ESI | EVI | Behavior |
|---|---|---|---|---|
| 4B:69:A5:BE:5E:21:2D:05:D9:5D:09:E0:D3:C2:6D:5E | C:0:3:8:: | 00:41:26:73:43:59:26:57:80:09 | 1F:4D:F0:6A | uDT4 |
| CA:56:69:8E:67:62:6E:CC:14:AA:2B:92:A6:D9:CA:A4 | B:1:4:A:: | 08:12:92:13:64:35:76:97:08:96 | 21:34:F0:7C | uDT6 |
| 42:3F:AD:CA:4F:20:05:DB:6C:9F:EF:FA:E5:10:41:1E | 2:4:8:3:: | 15:31:32:43:47:59:62:72:82:16 | 4A:01:FD:CC | uDX2 |
| ... | ... | ... | ... | ... |
| 0A:F0:04:F8:95:85:C3:A3:83:EE:6E:30:7D:84:34:CC | 4:1:0:A:: | 23:21:40:13:38:95:76:17:84:44 | 14:00:B1:62 | uA (PSP/USD) |

Table 300

APPARATUS, SYSTEM, AND METHOD FOR OPTIMIZING STORAGE USAGE IN CONNECTION WITH SEGMENT IDENTIFIERS

BACKGROUND

The Internet is built on and/or supported by network devices (such as routers) that facilitate the flow of traffic from one end-point to another. For example, a portion of the Internet may include and/or represent provider edge (PE) devices and/or customer edge (CE) devices that implement Ethernet virtual private network (EVPN) technology. In one example, a CE device may be multihomed to two PE devices in an EVPN configuration. In this example, the links between the CE device and the PE devices may form and/or constitute an Ethernet segment.

Continuing with this example, the CE device may advertise a media access control (MAC) address associated with and/or accessible via the Ethernet segment to only one of the PE devices instead of advertising the MAC address to both of the PE devices. As a result, the PE device that received the MAC address from the CE device may advertise a MAC route containing the MAC address to a remote device, but the other PE device that did not receive the MAC address from the CE device may be unable to advertise such a MAC route to the remote device. As a result, the remote device may be unable to load-balance the traffic for the MAC address, which is located behind both of the PE devices. To address this issue so that the remote device is able load-balance traffic across the multihomed Ethernet segment, the other PE device and/or the remote device may implement and/or apply aliasing, which enables the remote device to determine, infer, and/or deduce that the multihomed Ethernet segment is accessible and/or reachable via the other PE device.

As part of this aliasing, the other PE device may advertise an aliasing route that the remote device is able to use to determine, infer, and/or deduce that the multihomed Ethernet segment is also accessible and/or reachable via the other PE device. In one example, the aliasing route may include and/or represent a decapsulation and unicast MAC layer 2 table lookup (DT2U) segment identifier (SID). Unfortunately, some PE devices may have very limited memory available to store SIDs (as well as other routing data), and as the number of relevant SIDs continues to increase, those PE devices may be ill-equipped to accommodate storage for such SIDs. Accordingly, unless those PE devices apply some sort of new optimization to their memory resources, those PE devices' performance and/or utility may be undermined and/or impaired.

The instant disclosure, therefore, identifies and addresses a need for improved apparatuses, systems, and methods for optimizing storage usage in connection with SIDs.

SUMMARY

As will be described in greater detail below, the instant disclosure generally relates to apparatuses, systems, and methods for optimizing storage usage in connection with SIDs. In one example, a network device capable of accomplishing such a task may include and/or represent (1) at least one storage device configured to store a plurality of SIDs and (2) at least one processing device configured to (A) insert, into the storage device, a single instance of a SID corresponding to a multihomed network segment and/or (B) advertise the SID to a remote network device for aliasing to enable the remote network device to load-balance traffic across the multihomed network segment.

Similarly, a system that involves optimizing storage usage in connection with SIDs may include and/or represent at least a PE device and/or an additional PE device. In one example, the additional PE device may include and/or represent (1) at least one storage device configured to store a plurality of SIDs and (2) at least one processing device configured to (A) insert, into the storage device, a single instance of a SID corresponding to a multihomed network segment and/or (B) advertise the SID to the PE device for aliasing to enable the PE device to load-balance traffic across the multihomed network segment.

Additionally or alternatively, a method for optimizing storage usage in connection with SIDs may include and/or involve (1) configuring a storage device to store a plurality of segment identifiers, (2) inserting, into the storage device, a single instance of a segment identifier corresponding to a multihomed network segment, and/or (3) advertising the segment identifier to a remote network device for aliasing to enable the remote network device to load-balance traffic across the multihomed network segment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
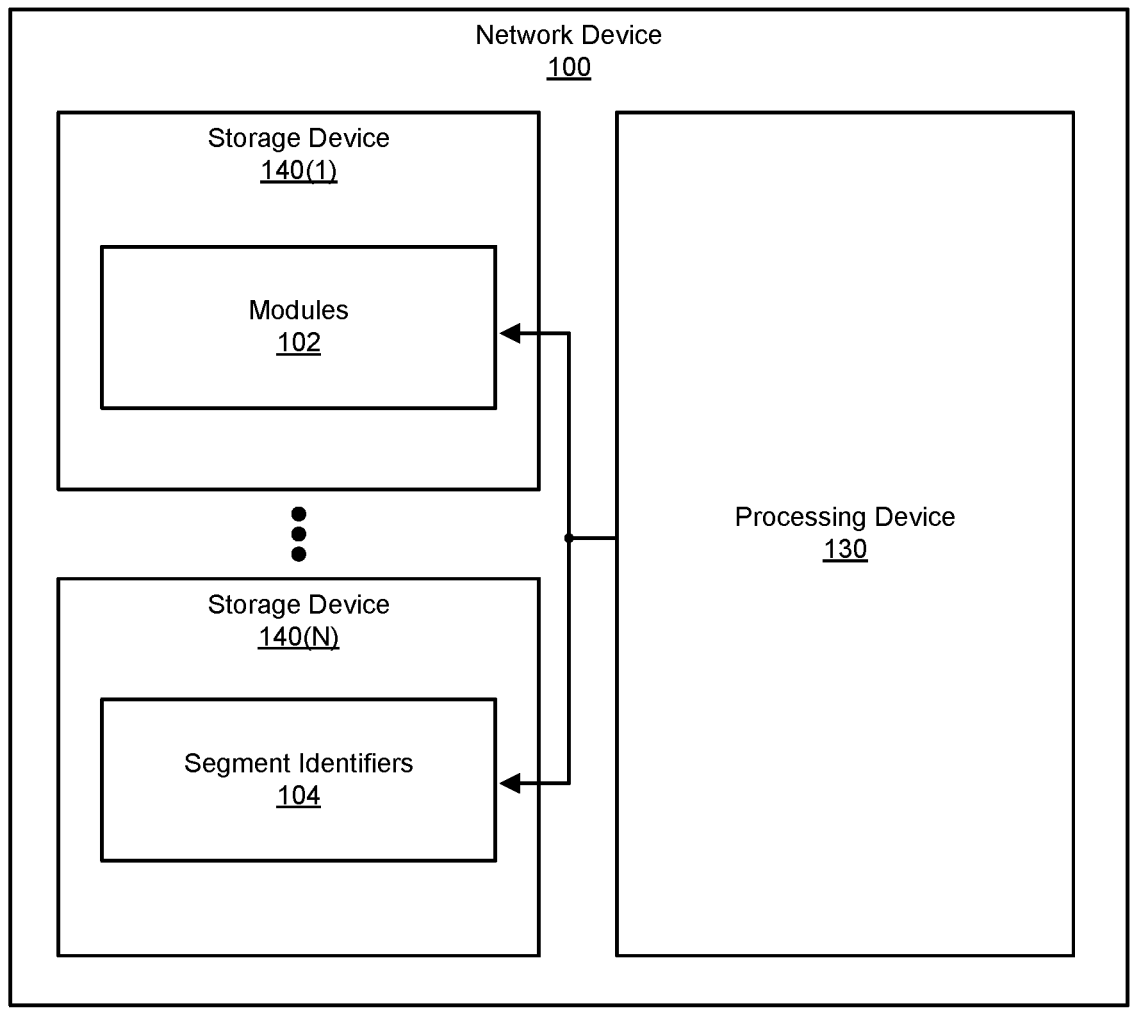
FIG. 1 is a block diagram of an exemplary network device for optimizing storage usage in connection with SIDs according to one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for optimizing storage usage in connection with segment routing Internet protocol version 6 (SRv6) SIDs. As will be explained in greater detail below, embodiments of the instant disclosure may reduce the amount of storage needed to maintain SRv6 SIDs in connection with routing instances that facilitate the flow of traffic across networks. For example, embodiments of the instant disclosure may eliminate, mitigate, and/or avoid certain redundancies among the SIDs by reusing a single instance of certain SIDs for different and/or alternative purposes (as opposed to storing duplicative instances of the same SIDs for such purposes). By doing so, embodiments of the instant disclosure may enable network devices to accommodate, store, and/or maintain more unique instances of SIDs in connection with routing instances, thereby potentially improving the performance, efficiency, and/or utility of such network devices.

The potential for redundant and/or duplicate instances of SIDs being stored in network devices may arise in certain circumstances. For example, if an Ethernet segment with a CE device is multihomed to multiple PE devices, the CE device may implement and/or apply a load-balancing function and/or hash key that hashes and/or directs traffic from one or more source MAC addresses to only one of those PE devices. As a result, only one of those PE devices may learn one or more MAC addresses associated with traffic transmitted and/or received by the CE device. In this example, only one of those PE devices may end up advertising MAC routes for such MAC addresses to a remote PE device even though both of those PE devices are connected to the multihomed Ethernet segment. Accordingly, the remote PE device may be unable to effectively load-balance traffic across the PE devices connected to the multihomed Ethernet segment.

To address this load-balancing deficiency and/or problem, an EVPN feature implemented by the PE devices may direct and/or cause the PE devices to perform aliasing. Through aliasing, the EVPN feature may direct and/or cause the PE device that did not advertise the MAC routes to indicate and/or signal its ability to reach an EVPN instance (EVI) on the multihomed Ethernet segment even though that PE device never learned the MAC addresses for the EVI and/or multihomed Ethernet segment. For example, the remote PE device may receive the MAC routes from the other PE device that advertised the MAC routes. From those MAC routes, the remote PE device may determine and/or learn that the EVI and/or multihomed Ethernet segment is reachable via the other PE device.

However, the remote PE device may need to rely on one or more aliasing routes from the PE device that did not advertise the MAC routes to determine and/or learn that the EVI and/or multihomed Ethernet segment is also reachable via the PE device. For example, in response to the instantiation of the multihomed Ethernet segment, the PE device may advertise an aliasing route that includes and/or contains a DT2U SID corresponding to unicast traffic destined for and/or originating from the multihomed Ethernet segment. In some conventional storage schemes, the PE device that did not advertise the MAC routes may store one instance of this DT2U SID for unicast traffic and another instance of this DT2U SID for aliasing.

Unfortunately, as the PE device likely has very limited memory available for storing SIDs, this redundancy of the DT2U SID may constitute and/or represent a suboptimal feature and/or inefficiency that results from the application of such conventional storage schemes when aliasing. As will be described in greater detail below, the PE device may be able to implement and/or apply a new storage optimization scheme that eliminates, mitigates, and/or avoids this redundancy of the DT2U SID in connection with aliasing. For example, the PE device may be able to rely on a single instance of this SID for all uses (e.g., unicast and aliasing purposes) without needing to store any other instances of this SID. In some examples, the new storage optimization scheme may conserve and/or save memory space on the PE device, thereby potentially improving the performance, efficiency, and/or utility of the PE device.

Figure 2:
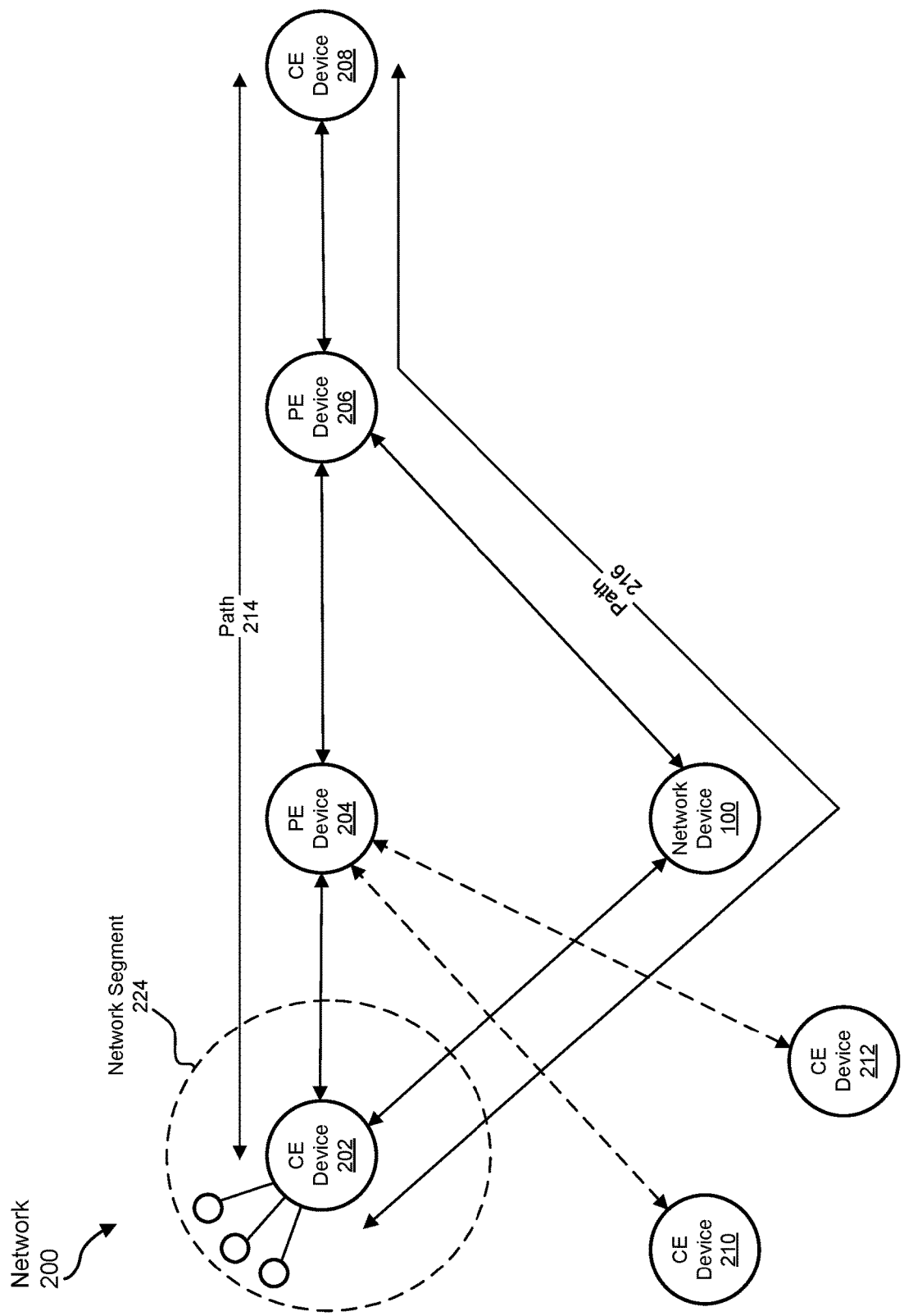
FIG. 2 is a block diagram of an exemplary network that includes network devices capable of optimizing storage usage in connection with SIDs according to one or more embodiments of this disclosure.
Figure 3:
FIG. 3 is an illustration of an exemplary table that associates certain SIDs with other identifiers, data, and/or behaviors according to one or more embodiments of this disclosure.

The following will provide, with reference to FIGS. 1-3 detailed descriptions of exemplary apparatuses, systems, components, and corresponding implementations for optimizing storage usage in connection with SIDs. Detailed descriptions of computer-implemented methods for optimizing storage usage in connection with SIDs will be provided in connection with FIG. 4. In addition, detailed descriptions of an exemplary computing system for carrying out these methods will be provided in connection with FIG. 5.

FIG. 1 shows an exemplary network device 100 that facilitates optimizing storage usage in connection with SIDs. As illustrated in FIG. 1, network device 100 may include one or more modules 102 for performing one or more tasks that support and/or contribute to optimizing storage usage in connection with SIDs. In some examples, one or more of modules 102 in FIG. 1 may represent portions of a single module, application, and/or operating system. For example, one or more of modules 102 may represent part of and/or be included in a storage-optimization application stored on and/or executed by network device 100.

In certain embodiments, one or more of modules 102 in FIG. 1 may include and/or represent one or more software applications, firmware modules, and/or operating system (OS) features that, when executed by a computing device, cause the computing device to perform one or more tasks. For example, and as will be described in greater detail below, one or more of modules 102 may be stored and/or configured to run on one or more computing devices, such as the devices illustrated in FIG. 2 (e.g., network device 100, PE devices 204 and 206, and/or CE devices 202, 206, 208, 210, and 212). One or more of modules 102 in FIG. 1 may also constitute and/or represent all or portions of one or more special-purpose computers configured to perform one or more tasks.

As illustrated in FIG. 1, exemplary network device 100 may also include one or more memory and/or storage devices, such as storage devices 140(1)-(N). Storage devices 140(1)-(N) may each generally constitute and/or represent any type or form of volatile or non-volatile memory device or medium capable of storing data, routing instances, and/or computer-readable instructions. In one example, one or more of storage devices 140(1)-(N) may store, load, and/or maintain one or more of modules 102. Additionally or alternatively, one or more of storage devices 140(1)-(N) may store, load, and/or maintain one or more SIDs 104. For example, storage device 140(N) may include and/or implement a forwarding information base (FIB) and/or routing information base (RIB) that stores one or more of SIDs 104. Examples of storage devices 140(1)-(N) include, without limitation, random access memory (RAM), read only memory (ROM), flash memory, hard disk drives (HDDs), solid-state drives (SSDs), optical disk drives, caches, variations or combinations of one or more of the same, and/or any other suitable storage devices.

As illustrated in FIG. 1, exemplary network device 100 may also include one or more physical processors, such as processing device 130. Processing device 130 may generally constitute and/or represent any type or form of hardware-implemented processor capable of interpreting and/or executing computer-readable instructions. In one example, processing device 130 may access and/or modify one or more of modules 102 stored in one or more of storage devices 140(1)-(N). Additionally or alternatively, processing device 130 may execute one or more of modules 102 to facilitate optimizing storage usage in connection with SIDs. Examples of processing device 130 include, without limitation, central processing units (CPUs), microprocessors, microcontrollers, field-programmable gate arrays (FPGAs), application-specific integrated circuits (ASICs), systems on chips (SoCs), parallel accelerated processors, tensor cores, integrated circuits, chiplets, distributed processing systems, portions of one or more of the same, variations or combinations of one or more of the same, and/or any other suitable processing device.

In some examples, network device 100 may further include one or more SIDs, such as SIDs 104. SIDs 104 may each generally constitute and/or represent any type or form of data, information, and/or identifier that represents and/or is associated with a network segment. In one example, SIDs 104 may each include and/or represent an Internet protocol (IP) version 6 (IPv6) address that represents and/or is assigned to an Ethernet segment. Such IPv6 addresses may constitute and/or be referred to as segment routing IPv6 (SRv6) SIDs. Additionally or alternatively, SIDs 104 may each include and/or represent fields dedicated to and/or reserved for a locator, a function, and/or arguments.

In some examples, network device 100 may generally represent any type or form of physical computing device capable of reading computer-executable instructions, handling network traffic, and/or optimizing storage usage in connection with SIDs. In one example, network device 100 may include and/or represent a router (such as a PE router, a CE router, a transit label switching router, a label edge router, a hub router, a spoke router, an autonomous system boundary router, and/or an area border router). Additional examples of network device 100 include, without limitation, switches, hubs, modems, bridges, repeaters, gateways (such as Broadband Network Gateways), multiplexers, network adapters, network interfaces, linecards, servers, portions of one or more of the same, variations or combinations of one or more of the same, and/or any other suitable devices.

An apparatus for optimizing storage usage in connection with SIDs may include all or portions of exemplary network device 100. In some examples, network device 100 in FIG. 1 may be implemented, applied, and/or deployed in a variety of ways. For example, all or a portion of exemplary network device 100 may represent part of exemplary network 200 in FIG. 2. As shown in FIG. 2, exemplary network 200 may include and/or represent a variety of network devices capable of communicating with one another via network connections and/or links.

As illustrated in FIG. 2, exemplary network 200 may include and/or represent various network devices and/or nodes that form and/or establish communication paths and/or network segments. For example, network 200 may include and/or represent network device 100, PE devices 204 and 206, and CE devices 202, 208, 210, and 212. In this example, both network device 100 and PE device 204 may be communicatively coupled to CE device 202 and PE device 206. Accordingly, CE device 202 may be multihomed to both PE device 204 and network device 100. Additionally or alternatively, PE device 206 may be communicatively coupled to network device 100, PE device 204, and/or CE device 208. Further, PE device 204 may be communicatively coupled to CE device 210 and CE device 212.

In some examples, the various network devices included in network 200 may establish, define, and/or form network paths and/or routes throughout or across portions of network 200. In such examples, those network paths and/or routes may carry and/or facilitate the flow of traffic throughout and/or across portions of network 200. In one example, network 200 may include and/or represent a network segment 224 comprised of CE device 202 and/or one or more additional devices (not necessarily labelled in FIG. 2). In this example, network segment 224 may include and/or represent an multihomed Ethernet segment.

In some examples, network 200 may generally constitute and/or represent any medium and/or architecture capable of facilitating communication, data transfer, and/or traffic flows from one device to another. In one example, network 200 may include and/or represent one or more additional devices that are not necessarily illustrated and/or labelled in FIG. 2. Network 200 may facilitate and/or support communication or data transfer using wireless and/or wired connections.

As a specific example, at least a portion of network 200 may include and/or represent an EVPN ELAN system and/or configuration. Additional examples of network 200 include, without limitation, an intranet, an access network, a layer 2 network, a layer 3 network, a multiprotocol label switching (MPLS) network, an Internet protocol (IP) network, a heterogeneous (e.g., layer 2, layer 3, IP, and/or MPLS) network, a wide area network (WAN), a local area network (LAN), a personal area network (PAN), the Internet, a virtual private network (VPN), power line communications (PLC), a cellular network (e.g., a global system for mobile communications network), portions of one or more of the same, variations or combinations of one or more of the same, and/or any other suitable network.

In some examples, network 200 may also implement and/or apply one or more communication protocols. Examples of such communication protocols include, without limitation, MPLS protocols, EVPN protocols, WAN protocols, IP protocols, LAN protocols, ELAN protocols, open system interconnection (OSI) protocols, VPN protocols, portions of one or more of the same, variations or combinations of one or more of the same, and/or any other suitable protocols.

Figure 4:
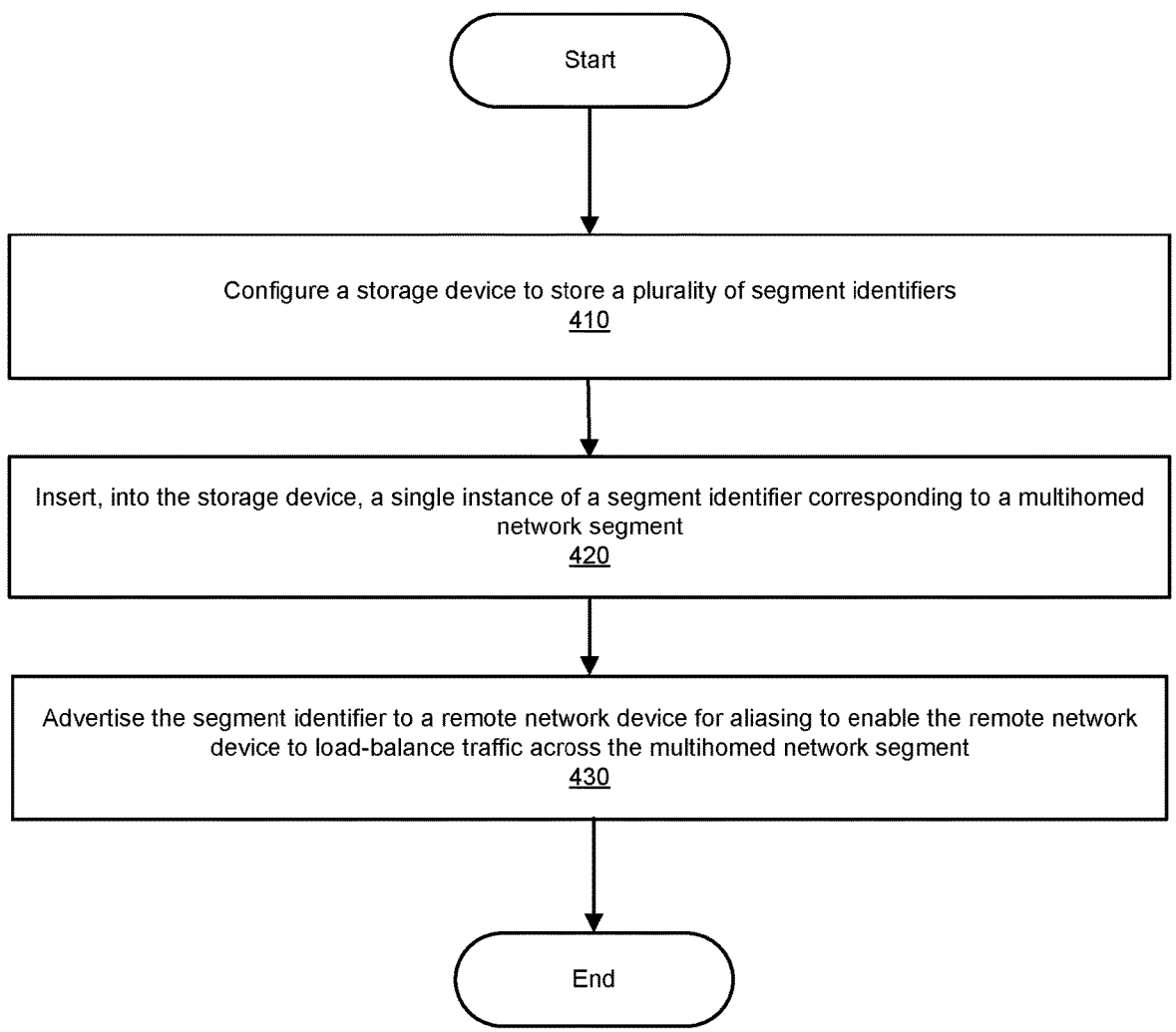
FIG. 4 is a flow diagram of an exemplary method for optimizing storage usage in connection with SIDs according to one or more embodiments of this disclosure.

FIG. 4 is a flow diagram of an exemplary computer-implemented method 400 for optimizing storage usage in connection with SIDs. The steps shown in FIG. 4 may be performed by any suitable computer-executable code and/or computing system, including network device 100 in FIG. 1, one or more devices deployed in network 200 in FIG. 2, and/or variations or combinations of one or more of the same. In addition, the steps shown in FIG. 4 may be performed by any suitable node, device, and/or component included in network 200 in FIG. 2 and/or the like. In one example, each of the steps shown in FIG. 4 may represent an algorithm whose structure includes and/or is represented by multiple sub-steps, examples of which will be provided in greater detail below.

As illustrated in FIG. 4, at step 410 one or more of the systems described herein may configure a storage device to store a plurality of SIDs. For example, one or more of modules 102 may, as part of network device 100 in FIG. 2, configure and/or program storage device 140(N) to accommodate, store, and/or maintain SIDs 104. In this example, one or more of modules 102 may direct and/or cause network device 100 to prepare storage device 140(N) for SIDs 104.

The systems described herein may perform step 410 in a variety of ways and/or contexts. In some examples, one or more of modules 102 may direct and/or cause processing device 130 to turn on, enable, and/or activate storage device 140(N). Additionally or alternatively, one or more of modules 102 may direct and/or cause processing device 130 to allocate memory space in storage device 140(N) for one or more of SIDs 104. For example, one or more of modules 102 may direct and/or cause processing device 130 to instantiate and/or prepare a table (such as a lookup table) to store entries that include SIDs 104.

As illustrated in FIG. 4, at step 420 one or more of the systems described herein may insert, into the storage device, a single instance of a SID corresponding to a multihomed network segment. For example, one or more of modules 102 may, as part of network device 100 in FIG. 2, insert a single instance of a DT2U/uDTU SID into storage device 140(N). In this example, the SID inserted into storage device 140(N) may correspond to and/or represent network segment 224, which is multihomed to PE device 204 and network device 100. Additionally or alternatively, the SID inserted into storage device 140(N) may correspond to and/or represent a bridge domain (BD) that includes a multi-homed network segment and/or one or more single-homed network segments. In one example, network segment 224 may constitute and/or represent a multihomed Ethernet segment that includes CE device 202.

The systems described herein may perform step 420 in a variety of ways and/or contexts. In some examples, one or more of modules 102 may direct and/or cause processing device 130 to enter and/or add the single instance of the SID into storage device 140(N). For example, network segment 224 may come up and/or be established, instantiated, and/or brought online. Upon doing so, PE device 204 and/or network device 100 may obtain and/or identify a SID corresponding to and/or representing network segment 224. PE device 204 and/or network device 100 may then advertise and/or transmit this SID to PE device 206.

In some examples, PE device 206 may receive and/or obtain this SID from PE device 204. In one example, upon receipt of this SID by PE device 206, one or more of modules 102 may direct and/or cause processing device 130 to insert and/or enter a single instance of this SID into storage device 140(N) if storage device 140(N) is not already storing a different instance of this SID. Accordingly, one or more of modules 102 may direct and/or cause processing device 130 to eliminate, mitigate, and/or avoid storage of redundant instances and/or copies of this SID in storage device 140(N) by ensuring and/or confirming that no other instance of this SID is present in storage device 140(N) before inserting and/or entering the single instance of this SID.

By eliminating and/or avoiding such redundancies, processing device 130 may enable storage device 140(N) to conserve and/or save memory space in storage device 140(N). As a result, processing device 130 may enable storage device 140(N) to store and/or maintain an increased number of unique SIDs, thereby potentially improving the performance, efficiency, and/or utility of network device 100.

In some examples, if storage device 140(N) is already storing an instance and/or copy of this SID, one or more of modules 102 may direct and/or cause processing device 130 to refuse to insert and/or enter any additional instance and/or copy of this SID into storage device 140(N). Additionally or alternatively, one or more of modules 102 may direct and/or cause processing device 130 to search storage device 140(N) for any redundant and/or duplicate SIDs (e.g., dedicated aliasing SIDs). In one example, if processing device 130 locates and/or identifies one or more redundant and/or duplicate SIDs during this search, one or more of modules 102 may direct and/or cause processing device 130 to remove and/or delete such redundant and/or duplicate SIDs from storage device 140(N), thereby freeing up and/or deallocating memory within storage device 140(N).

In some examples, one or more of modules 102 may direct and/or cause processing device 130 to search and/or examine storage device 140(N) for any instance and/or copy of this SID. In one example, one or more of modules 102 may direct and/or cause processing device 130 to detect and/or identify an existing instance of this SID in storage device 140(N) during the search and/or examination. In this example, one or more of modules 102 may direct and/or cause processing device 130 to refuse to insert and/or enter a duplicate instance of this SID into storage device 140(N) due at least in part to the existing instance of this SID having already been inserted into storage device 140(N).

In some examples, storage device 140(N) may store and/or maintain the single instance of this SID as a tunnel termination entry in a lookup table for one or more BDs. For example, storage device 140(N) may instantiate and/or be configured to store a unique instance of this SID in an exemplary table 300 in FIG. 3. As illustrated in FIG. 3, exemplary table 300 may associate and/or relate this SID with an Ethernet segment identifier (ESI) corresponding to network segment 224, an EVI implemented on network segment 224, and/or a behavior bound to and/or associated with this SID. In some examples, this SID may constitute and/or represent a 128-bit DT2U SID and/or a 16-bit or 32-bit uDT2U SID.

As a specific example, table 300 may associate and/or relate DT2U SIDs
"4B:69:A5:BE:5E:21:2D:05:D9:5D:09:E0:D3:C2:6D: 5E",
"CA:56:69:8E:67:62:6E:CC:14:AA:2B:92:A6:D9:CA: A4",
"42:3F:AD:CA:4F:20:05:DB:6C:9F:EF:FA:E5:10:41: 1E", and
"0A:F0:04:F8:95:85:C3:A3:83:EE:6E:30:7D:84:34:CC" with uDT2U SIDs "C:0:3:8::", "B:1:4:A:: ", "2:4:8:3:: ", and "4:1:0:A:: ", respectively. Continuing with this example, table 300 may also associated these DT2U/uDT2U SIDs with ESIs "00:41:26:73:43:59:26: 57:80:09", "08:12:92:13:64:35:76:97:08:96", "15:31: 32:43:47:59:62:72:82:16", and "23:21:40:13:38:95:76: 17:84:44", respectively. Continuing with this example, table 300 may further associate and/or relate these DT2U/uDT2U SIDs with EVIs "1F:4D:F0:6A", "21: 34:F0:7C", "4A:01:FD:CC", and "14:00:B1:62", respectively.

In some examples, each of the SIDs stored in storage device 140(N) and/or table 300 may be unique relative to one another. For example, storage device 140(N) and/or table 300 may include and/or contain no more than a single instance of and/or entry for each of SIDs "C:0:3:8:: ", "B:1:4:A:: ", "2:4:8:3:: ", and "4:1:0:A:: ". In one example, some of the SIDs stored in table 300 may correspond to and/or represent DT2U traffic and/or routes, and other SIDs stored in table 300 may correspond to and/or represent decapsulation and layer 2 table flooding (DT2M) traffic and/or routes. In this example, the DT2M SIDs may correspond to broadcast, unknown unicast, and multicast (BUM) traffic destined for and/or originating from network segment 224. However, none of the SIDs stored in table 300 may include and/or represent redundant instances of DT2U SIDs in a BD that result from and/or are used for aliasing and unicast.

In some examples, table 300 may include and/or represent a forwarding information base (FIB) and/or a Routing Information Base (RIB). In one example, table 300 may include and/or represent a set of SIDs and/or prefixes organized as a tree data structure in a FIB, a RIB, and/or a simulator. In this example, such prefixes may constitute and/or represent routes, data, and/or information that identify or refer to a portion of a network, network device, and/or network interface.

As illustrated in FIG. 4, at step 430 one or more of the systems described herein may advertise the SID to a remote network device for aliasing to enable the remote network device to load-balance traffic across the multihomed network segment. For example, one or more of modules 102 may, as part of network device 100 in FIG. 2, advertise the SID to PE device 206 for aliasing purposes. In this example, one or more of modules 102 may initiate the advertisement of the SID for aliasing in response to an instantiation and/or establishment of network segment 224. The advertisement of the SID may enable and/or cause PE device 206 to load-balance traffic to network segment 224 and/or CE device 202 via both PE device 204 and network device 100. Accordingly, the advertisement of the SID may facilitate load-balancing traffic across a multihomed network segment in the BD and/or to send unicast traffic for single-homed network segments in the same BD.

The systems described herein may perform step 430 in a variety of ways and/or contexts. In some examples, the advertisement of the SID may indicate and/or be used to determine that network segment 224 and/or CE device 202 is reachable through network device 100. In such examples, the advertisement of the SID may enable PE device 206 to impute reachability of a specific destination (e.g., a computing device accessible via and/or behind CE device 202) through network device 100 even though network device has not advertised the MAC address of the specific destination to PE device 206. As a result, PE device 206 may determine, infer, and/or deduce that CE device 202 is reachable and/or accessible via either PE device 204 or network device 100.

In some examples, PE device 206 may load-balance traffic destined for CE device 202 across PE device 204 and network device 100. For example, CE device 208 may transmit traffic destined for CE device 202 via paths 214 and 216. In this example, upon receiving such traffic, PE device 206 may load-balanced the traffic across PE device 204 and network device 100. In one example, path 214 may direct and/or cause traffic to traverse and/or flow from CE device 208 to CE device 202 via PE device 206 and PE device 204. Additionally or alternatively, path 216 may direct and/or cause traffic to traverse and/or flow from CE device 208 to CE device 202 via PE device 206 and network device 100.

In certain implementations, this traffic may originate from an end-point positioned behind CE device 208, and/or this traffic may be destined for an end-point positioned behind CE device 202. Accordingly, the destination of this traffic may be reachable and/or accessible through network segment 224. In one example, one or more of modules 102 may direct and/or cause processing device 130 to advertise the SID to PE device 206 for aliasing even though network device 100 has not learned a MAC address of the destination through and/or from network segment 224 or CE device 202.

In some examples, one or more of modules 102 may direct and/or cause processing device 130 to advertise one or more routes to PE device 206. In one example, the advertisement of the SID may enable PE device 206 to impute reachability of the destination via network device 100 based at least in part on the routes advertised to PE device 206. Examples of such routes include, without limitation, aliasing routes, Ethernet auto-discovery (A-D) per EVI routes, Ethernet A-D per Ethernet segment routes, portions of one or more of the same, variations or combinations of one or more of the same, and/or any other suitable routes.

In some examples, because CE device 202 is multihomed to PE device 204 and network device 100, CE device 202 may implement and/or apply a load-balancing function and/or hash key that hashes and/or directs traffic from one or more source MAC addresses to only PE device 204. As a result, only PE device 204 may learn one or more MAC addresses associated with traffic transmitted and/or received by CE device 202. In this example, only PE device 204 may end up advertising MAC routes for such MAC addresses to PE device 206 even though both PE device 204 and network device 100 are connected to multihomed network segment 224. Accordingly, PE device 206 may be unable to load-balance traffic across PE device 204 and network device 100 based on the MAC routes alone.

To address this load-balancing deficiency and/or problem, an EVPN feature implemented by network 200 may direct and/or cause one or more devices in network 200 to perform aliasing. Through aliasing, the EVPN feature may direct and/or cause network device 100, which did not advertise the MAC routes, to indicate and/or signal its ability to reach an EVI on multihomed network segment 224 even though network device 100 never learned the MAC addresses for the EVI and/or multihomed network segment 224. For example, PE device 206 may receive the MAC routes advertised by PE device 204. From those MAC routes, PE device 206 may determine and/or learn that the EVI and/or multihomed network segment 224 is reachable via PE device 204.

However, the PE device 206 may need to rely on one or more aliasing routes from network device 100, which did not advertise the MAC routes, to determine and/or learn that the EVI and/or multihomed network segment 224 is also reachable via network device 100. For example, in response to the instantiation of multihomed network segment 224, network device 100 may advertise an aliasing route that includes and/or contains a DT2U SID corresponding to unicast traffic destined for and/or originating from multihomed network segment 224. In some conventional storage schemes, network device 100 may store one instance of this DT2U SID for unicast traffic and a duplicate instance of this DT2U SID for aliasing.

In certain examples, network device 100 likely has very limited memory available for storing SIDs, and this redundancy of the DT2U SID may constitute and/or represent a suboptimal feature and/or inefficiency that results from the application of such conventional storage schemes when aliasing. Fortunately, network device 100 may be able to implement and/or apply a new storage optimization scheme that eliminates, mitigates, and/or avoids this redundancy of the DT2U SID in connection with aliasing. For example, network device 100 may be able to rely on a single instance of the DT2U SID for all uses (e.g., unicast and aliasing purposes) without needing to store any duplicate instances of this SID. In some examples, the new storage optimization scheme may conserve and/or save memory space on network device 100, thereby potentially improving the performance, efficiency, and/or utility of network device 100.

Figure 5:
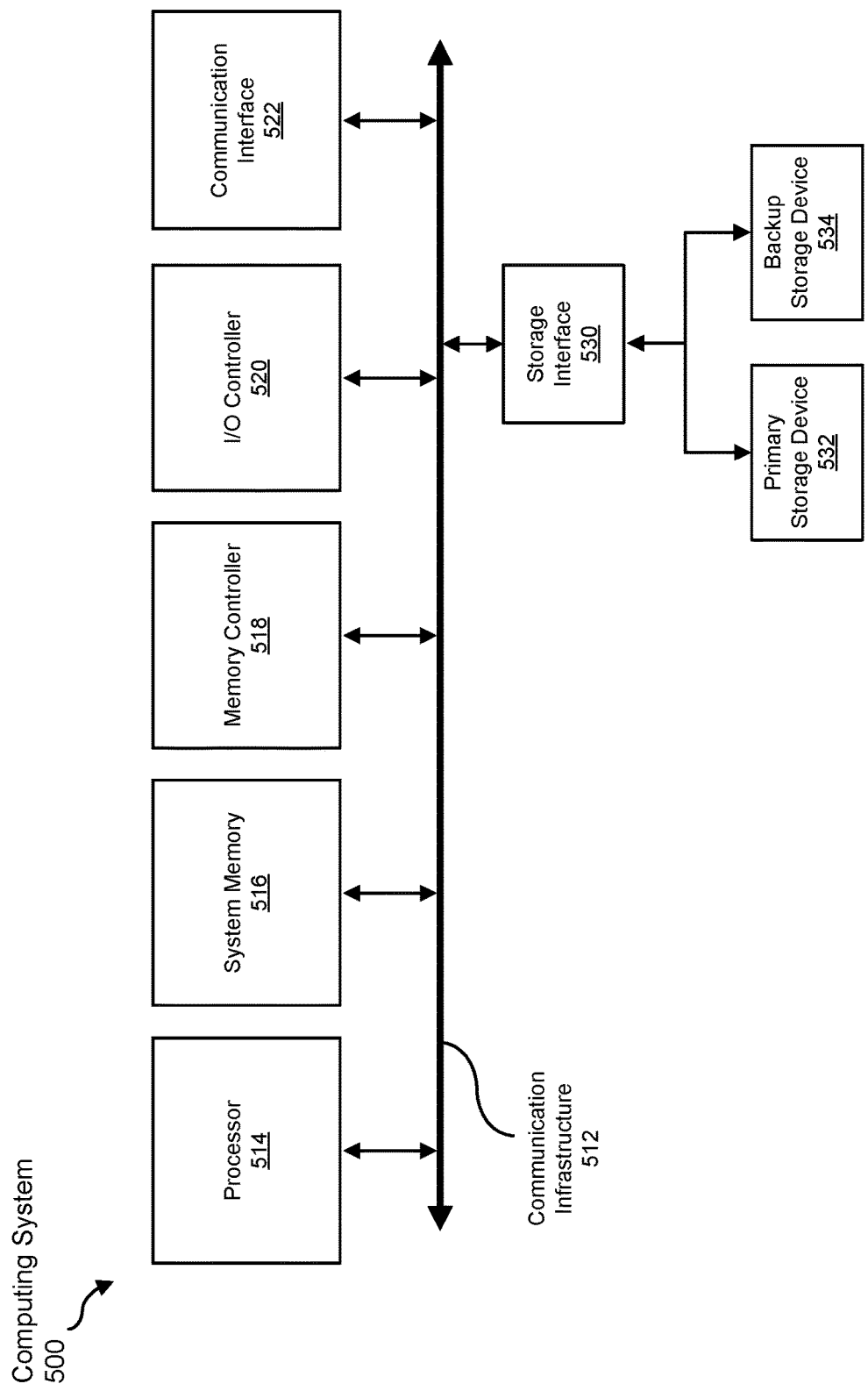
FIG. 5 is a block diagram of an exemplary computing system capable of implementing and/or being used in connection with one or more of the embodiments described in this disclosure.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPOE), a Point-to-Point Protocol over ATM (PPPOA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an ASIC, a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of network device 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A network device comprising:
at least one storage device configured to store a plurality of segment identifiers; and
at least one processing device configured to:
store, in the storage device, only a single instance of a segment identifier corresponding to a multihomed network segment accessible via multiple paths;
ensure that no duplicate instance of the segment identifier is stored in the storage device to conserve memory space in the storage device;
use the single instance of the segment identifier to both:
route traffic in connection with the multihomed network segment; and
facilitate aliasing by a remote network device; and
advertise the segment identifier to the remote network device for aliasing to enable the remote network device to:
determine that a specific destination is reachable through one of the multiple paths that includes the network device; and
load-balance traffic across the multiple paths.

2. The network device of claim 1, wherein the processing device is configured to refuse to store a duplicate instance of the segment identifier into the storage device due at least in part to the single instance of the segment identifier having already been stored into the storage device.

3. The network device of claim 2, wherein the processing device is configured to conserve memory within the storage device by refusing to store the duplicate instance of the segment identifier in the storage device.

4. The network device of claim 2, wherein the processing device is configured to receive the duplicate instance of the segment identifier from the multihomed network segment.

5. The network device of claim 2, wherein the processing device is configured to:
search the storage device for the single instance of the segment identifier;
identify the single instance of the segment identifier in the storage device during the search; and
refuse to store the duplicate instance of the segment identifier into the storage device due at least in part to the single instance of the segment identifier having already been stored into the storage device.

6. The network device of claim 1, wherein:
the traffic is destined for the specific destination; and
the processing device is configured to advertise the segment identifier to the remote network device for aliasing even though the network device has not learned a media access control address of the specific destination.

7. The network device of claim 6, wherein the advertisement of the segment identifier:
indicates that the multihomed network segment is reachable through the network device; and
enables the remote network device to impute reachability of the specific destination through the network device even though the network device has not advertised the media access control address of the specific destination to the remote network device.

8. The network device of claim 7, wherein:
the processing device is configured to advertise one or more routes to the remote network device; and
the advertisement of the segment identifier enables the remote network device to impute reachability of the specific destination based at least in part on the routes advertised to the remote network device.

9. The network device of claim 1, wherein the processing device is configured to receive the single instance of the segment identifier from the multihomed network segment upon an instantiation of the multihomed network segment.

10. The network device of claim 1, wherein the processing device is configured to advertise the segment identifier to the remote network device for aliasing in response to an instantiation of the multihomed network segment.

11. The network device of claim 1, wherein the storage device is configured to store the single instance of the segment identifier as a tunnel termination entry.

12. The network device of claim 1, wherein the multihomed network segment comprises a customer edge device communicatively coupled to a plurality of provider edge devices included in different routes between the remote network device and the customer edge device.

13. A system comprising:
a provider edge device; and
an additional provider edge device comprising:
at least one storage device configured to store a plurality of segment identifiers; and
at least one processing device configured to:
store, in the storage device, only a single instance of a segment identifier corresponding to a multihomed network segment accessible via multiple paths;
ensure that no duplicate instance of the segment identifier is stored in the storage device to conserve memory space in the storage device;
use the single instance of the segment identifier to both:
route traffic in connection with the multihomed network segment; and
facilitate aliasing by the provider edge device; and
advertise the segment identifier to the provider edge device for aliasing to enable the provider edge device to:
determine that a specific destination is reachable through one of the multiple paths that includes the network device; and
load-balance traffic across the multiple paths.

14. The system of claim 13, wherein the processing device is configured to refuse to store a duplicate instance of the segment identifier into the storage device due at least in part to the single instance of the segment identifier having already been stored into the storage device.

15. The system of claim 14, wherein the processing device is configured to conserve memory within the storage device by refusing to store the duplicate instance of the segment identifier in the storage device.

16. The system of claim 14, wherein the processing device is configured to receive the duplicate instance of the segment identifier from the multihomed network segment.

17. The system of claim 14, wherein the processing device is configured to:
search the storage device for the single instance of the segment identifier;
identify the single instance of the segment identifier in the storage device during the search; and
refuse to store the duplicate instance of the segment identifier into the storage device due at least in part to the single instance of the segment identifier having already been stored into the storage device.

18. The system of claim 13, wherein:
the traffic is destined for the specific destination; and
the processing device is configured to advertise the segment identifier to the provider edge device for aliasing even though the network device has not learned a media access control address of the specific destination.

19. A method comprising:
configuring a storage device to store a plurality of segment identifiers;
storing, in the storage device, only a single instance of a segment identifier corresponding to a multihomed network segment accessible via multiple paths;
ensuring that no duplicate instance of the segment identifier is stored in the storage device to conserve memory space in the storage device;
using the single instance of the segment identifier to both:
route traffic in connection with the multihomed network segment; and
facilitate aliasing by a remote network device; and
advertising the segment identifier to the remote network device for aliasing to enable the remote network device to:
determine that a specific destination is reachable through one of the multiple paths that includes the network device; and
load-balance traffic across the multiple paths.

20. The network device of claim 1, wherein the processing device is further configured to ensure that no duplicate instance of the segment identifier is stored in the storage device by:
identifying a duplicate instance of the segment identifier stored in the storage device; and
removing the duplicate instance of the segment identifier from the storage device to conserve memory within the storage device.

* * * * *